(12) United States Patent
Kawabata (10) Patent No.: US 11,442,211 B2
(45) Date of Patent: Sep. 13, 2022

(54) VIEWER FOR DETERMINATION OF AUTHENTICITY

(71) Applicant: ZEON CORPORATION, Tokyo (JP)

(72) Inventor: Koya Kawabata, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 146 days.

(21) Appl. No.: 16/646,567

(22) PCT Filed: Sep. 12, 2018

(86) PCT No.: PCT/JP2018/033846
§ 371 (c)(1),
(2) Date: Mar. 12, 2020

(87) PCT Pub. No.: WO2019/059067
PCT Pub. Date: Mar. 28, 2019

(65) Prior Publication Data
US 2020/0264358 A1    Aug. 20, 2020

(30) Foreign Application Priority Data
Sep. 22, 2017    (JP) .............................. JP2017-182648

(51) Int. Cl.
*G02B 5/30* (2006.01)
*B42D 25/391* (2014.01)

(52) U.S. Cl.
CPC ......... *G02B 5/3083* (2013.01); *G02B 5/3025* (2013.01); *B42D 25/391* (2014.10)

(58) Field of Classification Search
CPC ............ G02B 5/30–305; G02B 5/3083; B42D 25/00–485; B42D 2033/00–46; B42D 2035/00–50
See application file for complete search history.

(56) References Cited

U.S. PATENT DOCUMENTS

| 2002/0017633 | A1* | 2/2002 | Goulding ............... C09K 19/54 |
| | | | 252/299.5 |
| 2005/0030447 | A1 | 2/2005 | Hsu et al. |
| 2006/0001799 | A1 | 1/2006 | Kawamoto et al. |

(Continued)

FOREIGN PATENT DOCUMENTS

| JP | 2002372622 A | 12/2002 |
| JP | 2006178389 A | 7/2006 |

(Continued)

OTHER PUBLICATIONS

Mar. 24, 2020, International Preliminary Report on Patentability issued in the International Patent Application No. PCT/JP2018/033846.

(Continued)

*Primary Examiner* — Derek S. Chapel
*Assistant Examiner* — Adam W Booher
(74) *Attorney, Agent, or Firm* — Kenja IP Law PC (57) ABSTRACT

An authenticity determination viewer including a first phase difference film, a linear polarizer, and a second phase difference film in this order, wherein a polarized light transmission axis of the linear polarizer and a slow axis of the first phase difference film are non-parallel to each other, and the polarized light transmission axis of the linear polarizer and a slow axis of the second phase difference film are non-parallel to each other.

8 Claims, 3 Drawing Sheets

(56) References Cited

U.S. PATENT DOCUMENTS

| | | |
|---|---|---|
| 2006/0262258 A1 | 11/2006 | Wang et al. |
| 2007/0139773 A1 | 6/2007 | Kawamoto et al. |
| 2010/0015378 A1* | 1/2010 | Takeuchi ............... B65D 75/36 264/553 |
| 2010/0026450 A1* | 2/2010 | Hoshino ............... G03H 1/0011 348/E5.022 |
| 2012/0147299 A1* | 6/2012 | Park ................... G02F 1/133528 349/96 |
| 2013/0107173 A1 | 5/2013 | Takeda et al. |
| 2014/0293420 A1 | 10/2014 | Ko et al. |
| 2015/0285979 A1 | 10/2015 | Aimatsu |
| 2016/0245972 A1 | 8/2016 | Yamanaka et al. |
| 2017/0261668 A1 | 9/2017 | Hatano et al. |
| 2019/0187351 A1 | 6/2019 | Yamanaka et al. |

FOREIGN PATENT DOCUMENTS

| | | |
|---|---|---|
| JP | 3821940 B2 | 9/2006 |
| JP | 2007057971 A | 3/2007 |
| JP | 2008129421 A | 6/2008 |
| JP | 2013092707 A | 5/2013 |
| JP | 2014174471 A | 9/2014 |
| JP | 2015027743 A | 2/2015 |
| JP | 2016010857 A | 1/2016 |
| KR | 1020050016001 A | 2/2005 |
| WO | 2013046897 A1 | 4/2013 |
| WO | 2014069515 A1 | 5/2014 |
| WO | 2015064581 A1 | 5/2015 |

OTHER PUBLICATIONS

May 3, 2021, the Extended European Search Report issued by the European Patent Office in the corresponding European Patent Application No. 18859748.8.

Anonymous, Polarizer—wikipedia, Aug. 10, 2016, XP055439122, Retrieved from the Internet:URL:https://en.wikipedia.org/w/index.php?title=Polarizer&oldid=733796428 [retrieved on Jan. 9, 2018].

Oct. 16, 2018, International Search Report issued in the International Patent Application No. PCT/JP2018/033846.

* cited by examiner

VIEWER FOR DETERMINATION OF AUTHENTICITY

FIELD

The present invention relates to an authenticity determination viewer.

BACKGROUND

In order to prevent counterfeiting of an article that is required to be authentic, a marking that cannot be easily copied may be formed on the surface thereof. As one of materials used for such a marking, a resin having cholesteric regularity (hereinafter, sometimes referred to as a "cholesteric resin" as appropriate) is known.

The cholesteric resin usually has a circularly polarized light separation function. The "circularly polarized light separation function" refers to a function of allowing one of clockwise circularly polarized light and counterclockwise circularly polarized light to pass therethrough and of reflecting a part or the entirety of the other. Reflection of the circularly polarized light by the cholesteric resin takes place with the chirality thereof being maintained. A wavelength range in which the circularly polarized light separation function is exhibited as described above is sometimes referred to as a "selective reflection band".

A marking formed with the cholesteric resin thus gives different images appearing when observed through a clockwise circular polarizing plate and when observed through a counterclockwise circular polarizing plate. Thus, authenticity can be determined on the basis of the aforementioned image difference (see Patent Literature 1).

CITATION LIST

Patent Literature

Patent Literature 1: Japanese Patent No. 3821940

SUMMARY

Technical Problem

In prior-art techniques, observation for determining authenticity as described above has been carried out using a viewer including a clockwise circular polarizing plate and a counterclockwise circular polarizing plate. Specifically, a viewer including a clockwise circular polarizing plate and a counterclockwise circular polarizing plate in a separate manner like lenses for a pair of glasses has been generally used.

The viewer separately including the clockwise circular polarizing plate and the counterclockwise circular polarizing plate, however, is large in size because it requires an area of two circular polarizing plates. Thus, such a viewer has room for improvement in its ease of handling.

The present invention has been made in view of the foregoing problem, and an object of the present invention is to provide an authenticity determination viewer that can be downsized.

Solution to Problem

The present inventor has diligently conducted researches in order to solve the foregoing problem. As a result, the present inventor has found out that a viewer having an area of a single circular polarizing plate can be realized by providing, on each of front and rear surfaces of a linear polarizer, a phase difference film in such a manner that a polarized light transmission axis of the linear polarizer and a slow axis of the phase difference film are non-parallel to each other, and thus the present invention has been completed.

That is, the present invention includes the following.

<1> An authenticity determination viewer comprising a first phase difference film, a linear polarizer, and a second phase difference film in this order, wherein a polarized light transmission axis of the linear polarizer and a slow axis of the first phase difference film are non-parallel to each other, and the polarized light transmission axis of the linear polarizer and a slow axis of the second phase difference film are non-parallel to each other.

<2> The authenticity determination viewer according to <1>, wherein an angle formed between the slow axis of the first phase difference film and the slow axis of the second phase difference film is 0°±2°.

<3> The authenticity determination viewer according to <1> or <2>, wherein an angle formed between the polarized light transmission axis of the linear polarizer and the slow axis of the first phase difference film is 45°±2°, and an angle formed between the polarized light transmission axis of the linear polarizer and the slow axis of the second phase difference film is 45°±2°.

<4> The authenticity determination viewer according to any one of <1> to <3>, wherein an in-plane retardation of the first phase difference film at a measurement wavelength of 550 nm is 90 nm or more and 150 nm or less, and an in-plane retardation of the second phase difference film at a measurement wavelength of 550 nm is 90 nm or more and 150 nm or less.

<5> The authenticity determination viewer according to any one of <1> to <4>, wherein the first phase difference film and the second phase difference film have reverse wavelength dispersion.

<6> The authenticity determination viewer according to any one of <1> to <5>, comprising the first phase difference film, a third phase difference film, the linear polarizer, a fourth phase difference film, and the second phase difference film in this order.

<7> The authenticity determination viewer according to <6>, wherein the first phase difference film and the second phase difference film are capable of functioning as a ¼ wave plate, and the third phase difference film and the fourth phase difference film are capable of functioning as a ½ wave plate.

<8> The authenticity determination viewer according to <6> or <7>, wherein an in-plane retardation of the third phase difference film at a measurement wavelength of 550 nm is 240 nm or more and 300 nm or less, and an in-plane retardation of the fourth phase difference film at a measurement wavelength of 550 nm is 240 nm or more and 300 nm or less.

Advantageous Effects of Invention

The authenticity determination viewer of the present invention can be downsized.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, the slow axis of a film represents the slow axis in the plane of the film, unless otherwise specified.

In the following description, the angle formed between optical axes (such as polarized light absorption axis, polarized light transmission axis and slow axis) of each film or polarizer in a member comprising a plurality of films or polarizers represents an angle when viewed from the thickness direction thereof unless otherwise specified. Moreover, the thickness direction used herein is the thickness direction of these films or polarizers, and usually is identical to the thickness direction of the viewer.

In the following description, a "polarizing plate", and a "wave plate" include not only a rigid member but also a flexible member such as a resin film, unless otherwise specified.

In the following description, an in-plane retardation Re of a film is a value represented by $Re=(nx-ny) \times d$ unless otherwise specified. Herein, nx represents a refractive index in a direction in which the maximum refractive index is given among directions perpendicular to the thickness direction of the film (in-plane directions), ny represents a refractive index in a direction, among the above-mentioned in-plane directions of the film, orthogonal to the direction giving nx, and d represents the thickness of the film.

1. First Embodiment

Figure 1:
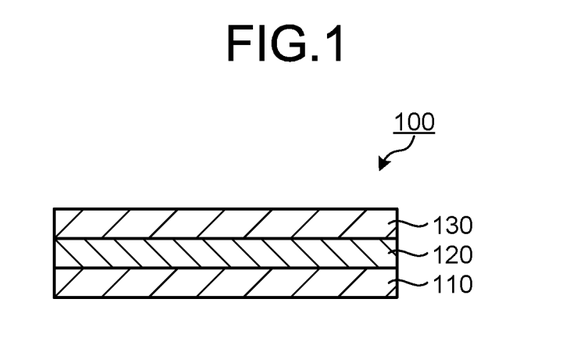
FIG. 1 is a cross-sectional view schematically showing an authenticity determination viewer according to a first embodiment of the present invention.
Figure 2:
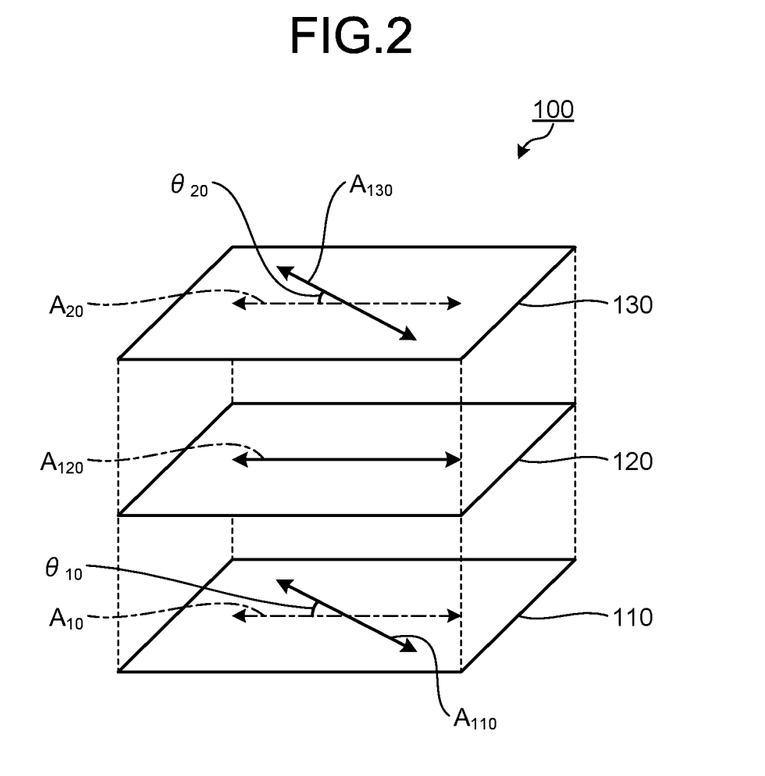
FIG. 2 is an exploded perspective view schematically showing, in an exploded manner, the authenticity determination viewer according to the first embodiment of the present invention.

FIG. 1 is a cross-sectional view schematically showing an authenticity determination viewer 100 according to a first embodiment of the present invention. FIG. 2 is an exploded perspective view schematically showing, in an exploded manner, the authenticity determination viewer 100 according to the first embodiment of the present invention. In FIG. 2, on a first phase difference film 110 and a second phase difference film 130, directions parallel to a polarized light transmission axis $A_{120}$ of a linear polarizer 120 are indicated by arrows $A_{10}$ and $A_{20}$ with a dot-and-dash line, respectively.

As shown in FIG. 1, the viewer 100 according to the first embodiment of the present invention comprises the first phase difference film 110, the linear polarizer 120, and the second phase difference film 130, which are provided in this order in the thickness direction.

As shown in FIG. 2, the linear polarizer 120 has a polarized light transmission axis $A_{120}$, and allows to pass therethrough linearly polarized light having an vibration direction parallel to the polarized light transmission axis $A_{120}$ and can block linearly polarized light having an vibration direction non-parallel to the polarized light transmission axis $A_{120}$. Herein, the vibration direction of linearly polarized light means the vibration direction of the electric field of linearly polarized light.

As shown in FIG. 1, the first phase difference film 110 is a phase difference film provided on one side of the linear polarizer 120. As shown in FIG. 2, the first phase difference film 110 has a slow axis $A_{110}$. From the viewpoint of enabling determination of authenticity, the slow axis $A_{110}$ of the first phase difference film 110 is non-parallel to the polarized light transmission axis $A_{120}$ of the linear polarizer 120.

An angle $\theta_{10}$ formed between the slow axis $A_{110}$ of the first phase difference film 110 and the polarized light transmission axis $A_{120}$ of the linear polarizer 120 is preferably 45°±2°, more preferably 45°±1°, and particularly preferably 45°±0.5°. This feature facilitates clarification of the difference between the images seen in the observation with alteration of the front-rear direction of the viewer 100, and therewith determination of authenticity can be easily performed.

Since the first phase difference film 110 is a phase difference film, it has an in-plane retardation. The specific in-plane retardation of the first phase difference film 110 is preferably set so as to be able to convert circularly polarized light entering the viewer 100 into linearly polarized light or elliptically polarized light, with which authenticity can be determined, at a wavelength of light used for authenticity determination. Specifically, the "wavelength of light used for authenticity determination" represents a wavelength in the selective reflection band of the cholesteric resin contained in the marking observed using the viewer 100. Therefore, it is preferable that the specific in-plane retardation of the first phase difference film 110 is set so that the first phase difference film 110 can function as a ¼ wave plate in the selective reflection band of the cholesteric resin contained in the marking.

In a particularly desirable aspect, the in-plane retardation of the first phase difference film 110 at a measurement wavelength of 550 nm is preferably 90 nm or more, more preferably 95 nm or more, and particularly preferably 100 nm or more, and is preferably 150 nm or less, more preferably 145 nm or less, and particularly preferably 140 nm or less. A phase difference film having an in-plane retardation in the aforementioned range at the measurement wavelength of 550 nm is usually capable of functioning as a ¼ wave plate in the visible wavelength region. Therefore, by using such a first phase difference film 110, the viewer 100 usable in the visible wavelength range can be realized.

The first phase difference film 110 preferably has reverse wavelength dispersion. Herein, reverse wavelength dispersion means that the in-plane retardations Re(450) and Re(550) at the measurement wavelengths of 450 nm and 550 nm satisfy the following formula (1).

$$Re(450) < Re(550) \qquad (1)$$

The phase difference film having reverse wavelength dispersion can exhibit its optical function in a wide wavelength range. Therefore, by using the first phase difference film 110 having reverse wavelength dispersion, the viewer 100 that can be used in a wide wavelength range can be realized.

As shown in FIG. 1, the second phase difference film 130 is a phase difference film provided on the other side of the linear polarizer 120. As shown in FIG. 2, the second phase difference film 130 has a slow axis $A_{130}$. The slow axis $A_{130}$ of the second phase difference film 130 is non-parallel to the polarized light transmission axis $A_{120}$ of the linear polarizer 120 from the viewpoint of enabling authenticity determination.

The slow axis $A_{130}$ of the second phase difference film 130 is preferably substantially parallel to the slow axis $A_{110}$ of the first phase difference film 110. Specifically, the angle (not shown) formed between the slow axis $A_{110}$ of the first phase difference film 110 and the slow axis $A_{130}$ of the second phase difference film 130 is preferably 0°±2°, more preferably 0°±1°, and particularly preferably 0°±0.5°. This feature facilitates clarification of the difference between the images seen in the observation with alteration of the front-rear direction of the viewer 100, and therewith determination of authenticity using the viewer 100 can be easily performed.

Further, it is preferable that the angle $\theta_{20}$ formed between the slow axis $A_{130}$ of the second phase difference film 130 and the polarized light transmission axis $A_{120}$ of the linear polarizer 120 is within the same range as that described for the range of the angle $\theta_{10}$ formed between the slow axis $A_{110}$ of the first phase difference film 110 and the polarized light transmission axis $A_{120}$ of the linear polarizer 120. In this case, the angle $\theta_{10}$ and the angle $\theta_{20}$ may be different from each other, but are particularly preferably the same. This feature facilitates clarification of the difference between the images seen in the observation with alteration of the front-rear direction of the viewer 100, and therewith determination of authenticity using the viewer 100 can be easily performed.

It is preferable that the in-plane retardation of the second phase difference film 130 is within the same range as that described for the range of the in-plane retardation of the first phase difference film 110. In this case, the in-plane retardation of the first phase difference film 110 and the in-plane retardation of the second phase difference film 130 may be different from each other, but are particularly preferably the same.

Further, from the viewpoint of realizing the viewer 100 that can be used in a wide wavelength range, the second phase difference film 130 preferably has reverse wavelength dispersion.

With the viewer 100 described above, it is possible to choose one of clockwise circularly polarized light and counterclockwise circularly polarized light as the circularly polarized light to be blocked in the viewer 100 by selecting the direction of the light passing through the viewer 100. Therefore, when the viewer 100 is used, it is possible to perform determination of authenticity utilizing the marking formed of the cholesteric resin.

Figure 3:
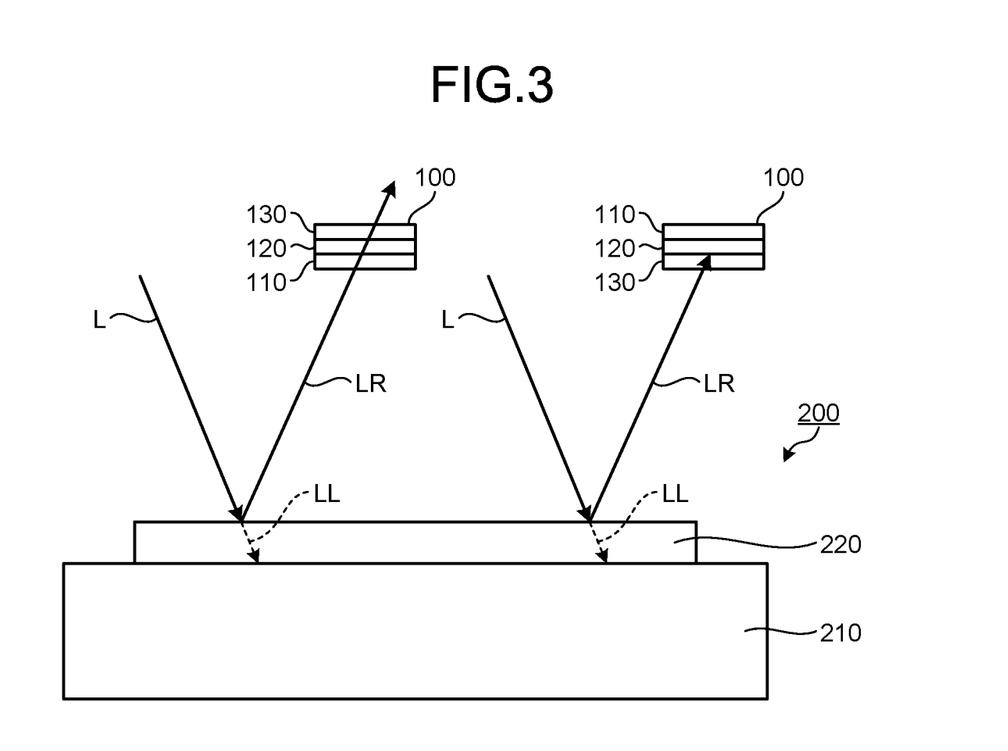
FIG. 3 is a cross-sectional view schematically showing an exemplary article produced by forming a marking on an object using a cholesteric resin.

A method for determining authenticity with the viewer 100 will be described below with reference to examples. FIG. 3 is a cross-sectional view schematically showing an exemplary article 200 produced by forming a marking 220 on an object 210 using a cholesteric resin. FIG. 3 schematically shows a path of light reflected at the object 210 and the marking 220. Although various light absorption and reflection, other than those described below, may occur in real articles, a major light path will be schematically explained in the following description for convenience of describing functions. In the example shown in FIG. 3, there is provided the marking 220 formed of the cholesteric resin that reflects a part of clockwise circularly polarized light (specifically, light in a selected wavelength region) and allows to pass therethrough the remaining part of the clockwise circularly polarized light and the entirety of counterclockwise circularly polarized light in a visible light region.

When light L containing the clockwise circularly polarized light is incident on an upper surface of the marking 220 of the article 200 shown in FIG. 3, a part of the clockwise circularly polarized light is reflected by the marking 220 to be reflected light LR, and the remaining part of the light L becomes transmitted light LL. Although the reflection in this case may occur not only on the surface of the marking 220 but also in the interior of the marking 220, FIG. 3 illustrates, as a schematic representation, that the reflection occurs on the front surface of the marking 220.

The marking 220 is then observed through the viewer 100. Usually, a plurality of such observations are carried out while changing the front-rear direction of the viewer 100. Specifically, the observations are carried out in the following direction of (i) and in the following direction of (ii).

(i) A direction in which the reflected light LR from the marking 220 passes through the first phase difference film 110, the linear polarizer 120, and the second phase difference film 130 in this order.

(ii) A direction in which the reflected light LR from the marking 220 passes through the second phase difference film 130, the linear polarizer 120, and the first phase difference film 110 in this order.

When such observations are carried out, the reflected light LR as the clockwise circularly polarized light passes through the viewer 100 in the observation in one of the aforementioned directions of (i) and (ii). In the example shown in FIG. 3, for example, the reflected light LR entering the first phase difference film 110 is converted into linearly polarized light having a vibration direction parallel to the polarized light transmission axis $A_{120}$ of the linear polarizer 120 by the first phase difference film 110. The linearly polarized light can pass through the linear polarizer 120, and can further pass through the second phase difference film 130.

The reflected light LR as the clockwise circularly polarized light, however, is blocked by the viewer 100 in the observation in the other one of the aforementioned directions of (i) and (ii). In the example shown in FIG. 3, for example, the reflected light LR entering the second phase difference film 130 is converted into linearly polarized light having a vibration direction perpendicular to the polarized light transmission axis $A_{120}$ of the linear polarizer 120 by the second phase difference film 130. Thus, the linearly polarized light is blocked by the linear polarizer 120.

According to the foregoing observations, an image observed in the aforementioned direction of (i) therefore differs from an image observed in the direction of (ii). Specifically, in the observation in one of the aforementioned directions of (i) and (ii), an image produced by the reflected light LR from the marking 220 can be seen, and thus the marking 220 can be seen. In the observation in the other one of the aforementioned directions of (i) and (ii), however, an image produced by the reflected light LR from the marking 220 is hard to see, and thus the marking 220 is hard to see or cannot be seen (in this case, only the object 210 is usually observed). Thus, if an image difference as described above is observed using the viewer 100, the article 200 having the marking 220 can be determined to be authentic. If no such image difference is observed, on the other hand, the article can be determined to be unauthentic.

Although the viewer 100 capable of allowing to pass therethrough or blocking the entirety of the reflected light LR is shown as an example in the foregoing description, the viewer 100 capable of allowing to pass therethrough or blocking a part of the reflected light LR can be also used to determine authenticity as long as such authenticity determination is possible.

As mentioned above, with the viewer 100, it is possible to choose one of the clockwise circularly polarized light and the counterclockwise circularly polarized light as the circularly polarized light to be blocked by selecting the front-rear direction. Thus, the viewer 100 can be used with an area of a single circular polarizing plate unlike the prior-art viewer including the clockwise circular polarizing plate and the counterclockwise circular polarizing plate in a separate manner, and thereby the viewer 100 can be downsized. As the viewer 100 can be downsized in this manner, handling convenience thereof can be improved.

Furthermore, in the present embodiment, the blocking of the clockwise circularly polarized light and the blocking of the counterclockwise circularly polarized light are performed by the common viewer 100 rather than being performed by separate circular polarizing plates as in the prior-art techniques. Thus, it is difficult to tamper with the viewer so as to make an unauthentic article appear to be authentic, thereby enhancing reliability in authenticity determination.

2. Second Embodiment

In the first embodiment described above, the viewer including one phase difference film (the first phase difference film and the second phase difference film) on each side of the linear polarizer has been shown and described. However, the viewer may include a plurality of phase difference films on each side of the linear polarizer. An embodiment thereof will be described below.

Figure 4:
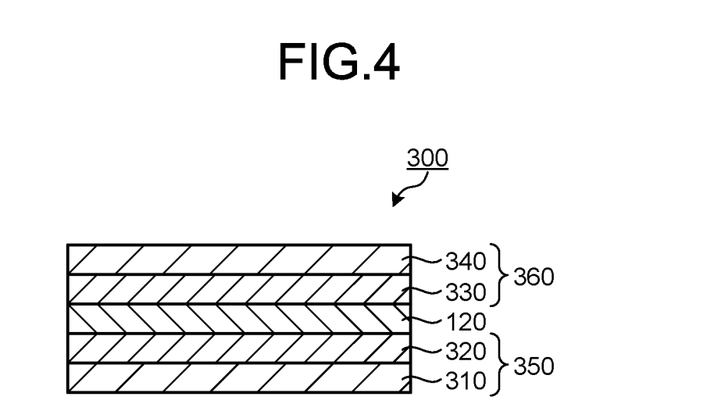
FIG. 4 is a cross-sectional view schematically showing an authenticity determination viewer according to a second embodiment of the present invention.
Figure 5:
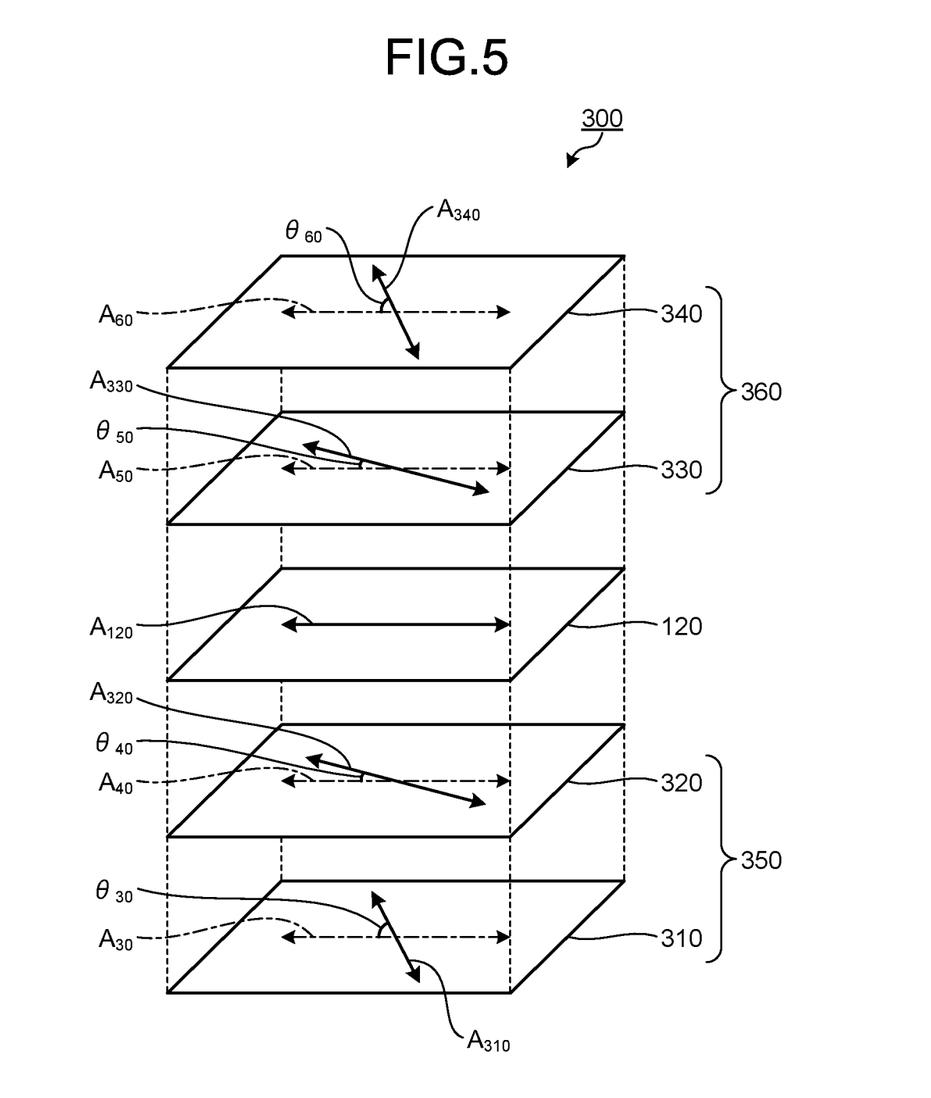
FIG. 5 is an exploded perspective view schematically showing, in an exploded manner, the authenticity determination viewer according to the second embodiment of the present invention.

FIG. 4 is a cross-sectional view schematically showing an authenticity determination viewer 300 according to a second embodiment of the present invention. FIG. 5 is an exploded perspective view schematically showing, in an exploded manner, the authenticity determination viewer 300 according to the second embodiment of the present invention. In FIG. 5, on a first λ/4 film 310, a first λ/2 film 320, a second λ/2 film 330, and a second λ/4 film 340, directions parallel to a polarization transmission axis $A_{120}$ of a linear polarizer 120 are indicated by arrows $A_{30}$, $A_{40}$, $A_{50}$ and $A_{60}$ with a dot-and-dash line, respectively.

As shown in FIG. 4, the viewer 300 according to the second embodiment of the present invention comprises the first λ/4 film 310 as a first phase difference film that can function as a ¼ wave plate, the first λ/2 film 320 as a third phase difference film that can function as a ½ wave plate, the linear polarizer 120, the second λ/2 film 330 as a fourth phase difference film that can function as a ½ wave plate, and the second λ/4 film 340 as a second phase difference film that can function as a ¼ wave plate, which are provided in this order in the thickness direction.

As shown in FIG. 5, the first λ/4 film 310 is a phase difference film having a slow axis $A_{310}$ that is non-parallel to the polarized light transmission axis $A_{120}$ of the linear polarizer 120. The in-plane retardation of the first λ/4 film 310 is set so that the first λ/4 film 310 can function as a ¼ wave plate in the selective reflection band of the cholesteric resin contained in the marking. The specific range of the in-plane retardation of the first λ/4 film 310 may be set to the same range as the range of the in-plane retardation of the first phase difference film 110 that can function as a ¼ wave plate in the first embodiment.

The first λ/2 film 320 is a phase difference film having a slow axis $A_{320}$ that is non-parallel to the polarized light transmission axis $A_{120}$ of the linear polarizer 120. The in-plane retardation of the first λ/2 film 320 is set so that the first λ/2 film 320 can function as a ½ wave plate in the selective reflection band of the cholesteric resin contained in the marking. The specific range of the in-plane retardation of the first λ/2 film 320 at a measurement wavelength of 550 nm is preferably 240 nm or more, and more preferably 250 nm or more, and is preferably 300 nm or less, more preferably 280 nm or less, and particularly preferably 265 nm or less.

Further, the angle $\theta_{30}$ formed between the slow axis $A_{310}$ of the first λ/4 film 310 and the polarized light transmission axis $A_{120}$ of the linear polarizer 120, and the angle $\theta_{40}$ formed between the slow axis $A_{320}$ of the first λ/2 film 320 and the polarized light transmission axis $A_{120}$ of the linear polarizer 120 satisfy the following requirement (A) or (B).

(A) The angle $\theta_{30}$ is 15°±10°, and the angle $\theta_{40}$ is 75°±5°.
(B) The angle $\theta_{30}$ is 75°±10°, and the angle $\theta_{40}$ is 15°±5°.

A detailed description for the requirement (A) will be given. The angle $\theta_{30}$ is usually 15°±10°, preferably 15°±5°, and more preferably 15°±2°. The angle $\theta_{40}$ is usually 75°±5°, preferably 75°±3°, and more preferably 75°±2°.

A detailed description for the requirement (B) will be given. The angle $\theta_{30}$ is usually 75°±10°, preferably 75°±5°, and more preferably 75°±2°. The angle $\theta_{40}$ is usually 15°±5°, preferably 15°±3°, and more preferably 15°±2°.

The combination of the first λ/4 film 310 and the first λ/2 film 320 as described above can function as a broadband ¼ wave plate 350 capable of converting circularly polarized light in a wide wavelength range, which enters the viewer 300, into linearly polarized light or elliptically polarized light, with which authenticity can be determined.

As shown in FIG. 5, the second λ/2 film 330 is a phase difference film having a slow axis $A_{330}$ that is non-parallel to the polarized light transmission axis $A_{120}$ of the linear polarizer 120. The in-plane retardation of the second λ/2 film 330 is usually in the same range as that described for the range of the in-plane retardation of the first λ/2 film 320. In this case, the in-plane retardation of the first λ/2 film 320 and the in-plane retardation of the second λ/2 film 330 may be different from each other, but are particularly preferably the same.

The second λ/4 film 340 is a phase difference film having a slow axis $A_{340}$ that is non-parallel to the polarized light transmission axis $A_{120}$ of the linear polarizer 120. The in-plane retardation of the second λ/4 film 340 is usually in the same range as that described for the range of the in-plane retardation of the first λ/4 film 310. In this case, the in-plane retardation of the first λ/4 film 310 and the in-plane retardation of the second λ/4 film 340 may be different from each other, but are particularly preferably the same.

Further, the angle $\theta_{50}$ formed between the slow axis $A_{330}$ of the second λ/2 film 330 and the polarized light transmission axis $A_{120}$ of the linear polarizer 120 is usually in the same range as that described for the range of the angle $\theta_{40}$ formed between the slow axis $A_{320}$ of the first λ/2 film 320 and the polarized light transmission axis $A_{120}$ of the linear polarizer 120. The angle $\theta_{60}$ formed between the slow axis $A_{340}$ of the second λ/4 film 340 and the polarized light transmission axis $A_{120}$ of the linear polarizer 120 is in the same range as that described for the range of the angle $\theta_{30}$ formed between the slow axis $A_{310}$ of the first $\lambda/4$ film 310 and the polarized light transmission axis $A_{120}$ of the linear polarizer 120. Therefore, the angle $\theta_{50}$ formed between the slow axis $A_{330}$ of the second $\lambda/2$ film 330 and the polarized light transmission axis $A_{120}$ of the linear polarizer 120, and the angle $\theta_{60}$ formed between the slow axis $A_{340}$ of the second $\lambda/4$ film 340 and the polarized light transmission axis $A_{120}$ of the linear polarizer 120 satisfy the following requirement (C) or (D).

(C) The angle $\theta_{50}$ is 75°±5°, and the angle $\theta_{60}$ is 15°±10°.
(D) The angle $\theta_{50}$ is 15°±5°, and the angle $\theta_{60}$ is 75°±10°.

The combination of the second $\lambda/2$ film 330 and the second $\lambda/4$ film 340 as described above can function as a broadband ¼ wave plate 360 capable of converting circularly polarized light in a wide wavelength range, which enters the viewer 300, into linearly polarized light or elliptically polarized light, with which authenticity can be determined.

The angle $\theta_{30}$ and the angle $\theta_{60}$ may be different from each other, but are particularly preferably the same. The angle $\theta_{40}$ and the angle $\theta_{50}$ may be different from each other, but are particularly preferably the same. This feature facilitates clarification of the difference between the images seen in the observation with alteration of the front-rear direction of the viewer 300, and therewith determination of authenticity using the viewer 300 can be easily performed.

Further, the slow axis $A_{330}$ of the second $\lambda/2$ film 330 is preferably substantially parallel to the slow axis $A_{320}$ of the first $\lambda/2$ film 320. Specifically, the angle (not shown) formed between the slow axis $A_{320}$ of the first $\lambda/2$ film 320 and the slow axis $A_{330}$ of the second $\lambda/2$ film 330 is preferably 0°±2°, more preferably 0°±1°, and particularly preferably 0°±0.5°. This feature facilitates clarification of the difference between the images seen in the observation with alteration of the front-rear direction of the viewer 300, and therewith determination of authenticity using the viewer 300 can be easily performed.

The slow axis $A_{340}$ of the second $\lambda/4$ film 340 is preferably substantially parallel to the slow axis $A_{310}$ of the first $\lambda/4$ film 310. Specifically, the angle (not shown) formed between the slow axis $A_{310}$ of the first $\lambda/4$ film 310 and the slow axis $A_{340}$ of the second $\lambda/4$ film 340 is preferably 0°±2°, more preferably 0°±1°, and particularly preferably 0°±0.5°. This feature facilitates clarification of the difference between the images seen in the observation with alteration of the front-rear direction of the viewer 300, and therewith determination of authenticity using the viewer 300 can be easily performed.

In the same manner as with the viewer 100 described in the first embodiment, it is possible with the viewer 300 to choose one of the clockwise circularly polarized light and the counterclockwise circularly polarized light as the circularly polarized light to be blocked in the viewer 300 by selecting the direction of the light passing through the viewer 300. Thus, when the viewer 300 is used, determination of authenticity utilizing the marking formed of the cholesteric resin can be performed in the same manner as that of the viewer 100 described in the first embodiment. The viewer 300 can be downsized in the same manner as the viewer 100 described in the first embodiment, and can also obtain the same effects as those obtained by the viewer 100 described in the first embodiment.

Other Embodiments

Although the embodiments of the present invention have been described above, the present invention may be carried out by further making modifications to the aforementioned embodiments.

For example, the viewer may be provided with an optional element other than the linear polarizer and the phase difference films. Examples of such an optional element may include a tackiness agent layer, an adhesive agent layer, and a hard-coat layer. Furthermore, the viewer may include, as an optional element, a frame for supporting the linear polarizer and the phase difference films, for example. The viewer including a frame along the edges of the linear polarizer and the phase difference films, for example, can be handled by gripping the frame, thereby making it possible to prevent the damage of the linear polarizer and the phase difference films.

On the frame, a description regarding the viewer may be indicated. For example, a description regarding how the marking is seen through the viewer may be indicated on the frame.

As a specific example, a first description (for example, "bright" or the like) indicating that the reflected light from the marking can pass through the viewer may be shown in a portion of the frame. The first description may be indicated on a portion of the frame that comes into the sight of a user when the front-rear direction of the viewer is adjusted whereby the reflected light from the marking can pass through the viewer. Also, a second description (for example, "dark" or the like) indicating that the reflected light from the marking is blocked by the viewer may be shown in another portion of the frame. The second description may be shown in a portion of the frame that comes into the sight of a user when the front-rear direction of the viewer is adjusted so that the reflected light from the marking is blocked by the viewer. When the frame according to such a specific example is used, a user can readily understand how to use the viewer.

As an optional element, the viewer may further be provided with attachment equipment for attaching the viewer to any optional article, for example. Examples of such attachment equipment may include a string, a pin, and a clip. The method for providing the attachment equipment to the viewer may be any optional method. For example, the attachment equipment may be provided by being bonded to the linear polarizer, the phase difference film, or the frame. As another example, the attachment equipment may be provided by being stapled to the linear polarizer, the phase difference film, or the frame. As still another example, the attachment equipment may be provided by forming a hole in the linear polarizer, the phase difference film, or the frame and then passing the attachment equipment, such as a string, through the hole. With the use of such attachment equipment, the viewer can be attached to an object having the marking formed thereon. Accordingly, the object and the viewer can be sold as a combination, and thereby distribution of the viewers in the market can be promoted.

Linear Polarizer

Examples of the linear polarizer for use may include a film obtained by performing appropriate treatments such as dyeing treatment with a dichroic substance such as iodine and a dichroic dye, stretching treatment, and crosslinking treatment to a film of a vinyl alcohol-based polymer such as polyvinyl alcohol and partially formalized polyvinyl alcohol in an appropriate order and manner. Among these, a linear polarizer containing a dichroic dye is preferable from the viewpoint of improving heat resistance. It is preferable that the linear polarizer has an excellent degree of polarization.

The thickness of the linear polarizer is generally 5 µm to 80 µm, and is not limited thereto.

Phase Difference Film

As the phase difference film described above, for example, a stretched film may be used. The stretched film is a film obtained by stretching a resin film. By appropriately adjusting factors such as the type of resin, stretching conditions and thickness, a stretched film having any optional in-plane retardation can be obtained.

As the resin, a thermoplastic resin is usually used. The thermoplastic resin may include a polymer and, if necessary, an optional component. Examples of the polymer may include polycarbonate, polyethersulfone, polyethylene terephthalate, polyimide, polymethylmethacrylate, polysulfone, polyarylate, polyethylene, polyphenylene ether, polystyrene, polyvinyl chloride, cellulose diacetate, cellulose triacetate, and an alicyclic structure-containing polymer. As the polymer, one type thereof may be solely used, and two or more types thereof may also be used in combination at any ratio. Among these, an alicyclic structure-containing polymer is preferable from the viewpoints of transparency, low hygroscopicity, size stability, and processability. The alicyclic structure-containing polymer is a polymer containing an alicyclic structure in a main chain and/or a side chain, and, for example, those described in Japanese Patent Application Laid-Open No. 2007-057971 A may be used.

The stretched film as the phase difference film may be produced by producing a resin film from the resin described above and then subjecting the resin film to a stretching treatment.

Examples of the method for producing the resin film may include a cast molding method, an inflation molding method, and an extrusion molding method, among which an extrusion molding method is preferable.

The stretching treatment may be performed by, for example, a rolling method, a floating method, and a tenter method. In the stretching treatment, it is preferable that the stretching direction is appropriately set so that the slow axis of the stretched film is oriented in a desired direction. Therefore, the stretching treatment may be stretching in the width direction of the resin film (lateral stretching), stretching in the lengthwise direction (longitudinal stretching), stretching in an oblique direction which is neither the width direction nor the lengthwise direction, or a combination thereof, depending on the direction of the slow axis to be expressed in the stretched film.

The stretching temperature and the stretching ratio may be optionally set within a range in which a desired in-plane retardation can be obtained. To give specific ranges, the stretching temperature is preferably Tg−30° C. or higher, and more preferably Tg−10° C. or higher, and is preferably Tg+60° C. or lower, and more preferably Tg+50° C. or lower. The stretching ratio is preferably 1.1 times or more, more preferably 1.2 times or more, and particularly preferably 1.5 times or more, and is preferably 30 times or less, more preferably 10 times or less, and particularly preferably 5 times or less. Herein, Tg represents a glass transition temperature of the resin.

The thickness of the stretched film is not particularly limited, and is preferably 5 µm or more, more preferably 10 µm or more, and particularly preferably 20 µm or more, and is preferably 1 mm or less, more preferably 500 µm or less, and particularly preferably 200 µm or less.

As the phase difference film, for example, a film including a liquid crystal cured layer may be used. The liquid crystal cured layer is a layer formed of a cured product of a liquid crystal composition containing a liquid crystal compound. Herein, for the sake of convenience, a material referred to as a "liquid crystal composition" includes not only a mixture of two or more substances, but also a material consisting of a single substance. Usually, a liquid crystal cured layer is obtained by forming a layer of a liquid crystal composition, giving orientation to molecules of a liquid crystal compound included in the layer of the liquid crystal composition, and then curing the layer of the liquid crystal composition. This liquid crystal cured layer can have any optional in-plane retardation by appropriately adjusting factors such as the type of the liquid crystal compound, the orientation state of the liquid crystal compound and the thickness.

The type of the liquid crystal compound may be any type, but when it is desired to obtain a phase difference film having reverse wavelength dispersion, it is preferable to use a liquid crystal compound having reverse wavelength dispersion. The liquid crystal compound having reverse wavelength dispersion refers to a liquid crystal compound exhibiting reverse wavelength dispersion when homogeneously oriented. To give homogenous orientation to a liquid crystal compound means that a layer containing the liquid crystal compound is formed and the long axis direction of mesogens of molecules of the liquid crystal compound in the layer is oriented in a certain one direction parallel to the plane of the layer. Specific examples of the liquid crystal compound having reverse wavelength dispersion may include compounds described in International Publication No. 2014/069515, and International Publication No. 2015/064581.

The thickness of the liquid crystal cured layer is not particularly limited, and is preferably 0.5 µm or more, and more preferably 1.0 µm or more, and is preferably 10 µm or less, more preferably 7 µm or less, and particularly preferably 5 µm or less.

Marking

The marking to be observed using the viewer contains the cholesteric resin. As described above, the cholesteric resin is a resin having cholesteric regularity. The cholesteric regularity is a structure in which the angle of molecular axes in stacking planes in the resin are shifted (twisted) as the planes are observed sequentially passing through the stacked planes, such that molecular axes in a certain first plane are oriented in a certain direction, molecular axes in a subsequent plane stacking on the first plane are oriented in a direction shifted by a small angle with respected to that of the first plane, and molecular axes in still another plane are oriented in a direction of a further shifted angle. That is, when molecules inside a certain layer have cholesteric regularity, molecular axes of the molecules on a first plane inside the layer are aligned along a constant direction. On the subsequent second plane stacking on the first plane inside the layer, a direction of molecular axes is shifted by a slight angle from the direction of the molecular axes on the first plane. On the subsequent third plane further stacking on the second plane, a direction of molecular axes is further shifted by an angle from the direction of the molecular axes on the second plane. In this manner, on the planes disposed in a stacking manner, the angles of the molecular axes on these planes are sequentially shifted (twisted). The structure in which the directions of the molecular axes are twisted in this manner is usually a helical structure and is an optically chiral structure. Since the cholesteric resin has the circularly polarized light separation function, the marking can reflect circularly polarized light of a color corresponding to the selective reflection band of the cholesteric resin.

As the cholesteric resin, for example, a cured product of a cholesteric liquid crystal composition may be used. The cholesteric liquid crystal composition refers to a composition in which the liquid crystal compound can exhibit a liquid crystal phase having cholesteric regularity (cholesteric liquid crystal phase) when the liquid crystal compound contained in the liquid crystal composition is oriented. When the cholesteric liquid crystal composition is cured, the liquid crystal compound is usually polymerized in a state in which it exhibits a cholesteric liquid crystal phase, so that a layer of a cholesteric resin which is cured to be in a non-liquid crystal state while exhibiting cholesteric regularity can be obtained.

As the cholesteric resin serving as the cured product of the cholesteric liquid crystal composition, for example, those described in Japanese Patent Application Laid-Open No. 2014-174471 A, Japanese Patent Application Laid-Open No. 2015-27743 A, and the like may be used.

Specific examples of the marking may include a marking formed by attaching, onto an object, an identification medium such as a label including a layer of the cholesteric resin having a desired planar shape.

Another specific example of the marking may be a marking formed by drawing a desired planar shape on an object with a paint containing a pigment including a layer of the cholesteric resin.

The object on which the marking is to be formed is not limited to any particular object, and a wide variety of articles may be employed. Examples of the object may include: a fabric product such as clothes; a leather product such as a bag and shoes; a metal product such as a screw; a paper product such as a price tag; and a rubber product such as a tire. The object, however, is not limited to these examples.

REFERENCE SIGN LIST 100 viewer
110 first phase difference film
120 linear polarizer
130 second phase difference film
200 article
210 object
220 marking
300 viewer
310 first λ/4 film
320 first λ/2 film
330 second λ/2 film
340 second λ/4 film
350 broadband ¼ wave plate
360 broadband ¼ wave plate

The invention claimed is:

1. An authenticity determination viewer comprising a first phase difference film, a linear polarizer, and a second phase difference film in this order, and further comprising a frame supporting the first phase difference film, the linear polarizer, and the second phase difference film, wherein
a polarized light transmission axis of the linear polarizer and a slow axis of the first phase difference film are non-parallel to each other,
the polarized light transmission axis of the linear polarizer and a slow axis of the second phase difference film are non-parallel to each other,
a first description is shown in a portion of the frame that comes into the sight of a user when a front-rear direction of the authenticity determination viewer is adjusted so that a reflected light from a marking containing a cholesteric resin passes through the authenticity determination viewer,
the first description indicates that the reflected light from the marking can pass through the authenticity determination viewer,
a second description is shown in a portion of the frame that comes into the sight of a user when the front-rear direction of the authenticity determination viewer is adjusted so that the reflected light from the marking is blocked by the authenticity determination viewer, and
the second description indicates that the reflected light from the marking can be blocked by the authenticity determination viewer.

2. The authenticity determination viewer according to claim 1, wherein an angle formed between the slow axis of the first phase difference film and the slow axis of the second phase difference film is 0°±2°.

3. The authenticity determination viewer according to claim 1, wherein
an angle formed between the polarized light transmission axis of the linear polarizer and the slow axis of the first phase difference film is 45°±2°, and
an angle formed between the polarized light transmission axis of the linear polarizer and the slow axis of the second phase difference film is 45°±2°.

4. The authenticity determination viewer according to claim 1, wherein
an in-plane retardation of the first phase difference film at a measurement wavelength of 550 nm is 90 nm or more and 150 nm or less, and
an in-plane retardation of the second phase difference film at a measurement wavelength of 550 nm is 90 nm or more and 150 nm or less.

5. The authenticity determination viewer according to claim 1, wherein the first phase difference film and the second phase difference film have reverse wavelength dispersion.

6. The authenticity determination viewer according to claim 1, comprising the first phase difference film, a third phase difference film, the linear polarizer, a fourth phase difference film, and the second phase difference film in this order.

7. The authenticity determination viewer according to claim 6, wherein
the first phase difference film and the second phase difference film are capable of functioning as a ¼ wave plate, and
the third phase difference film and the fourth phase difference film are capable of functioning as a ½ wave plate.

8. The authenticity determination viewer according to claim 6, wherein
an in-plane retardation of the third phase difference film at a measurement wavelength of 550 nm is 240 nm or more and 300 nm or less, and
an in-plane retardation of the fourth phase difference film at a measurement wavelength of 550 nm is 240 nm or more and 300 nm or less.

* * * * *